United States Patent [19]
Yamashita et al.

[11] Patent Number: 5,757,650
[45] Date of Patent: May 26, 1998

[54] METHOD OF CORRECTING STOCK CONDITION IN AN AUTOMATED STOREHOUSE CONTROL AND APPARATUS THEREFOR, AND METHOD OF CORRECTING CONVEYANCE STATE OF PARTS AND APPARATUS THEREFOR

[75] Inventors: Tomimasa Yamashita, Kameyama; Takio Okuno; Katsuhiro Hagino, both of Suzuka, all of Japan

[73] Assignee: Honda Giken Kogyo Kabushiki Kaisha, Tokyo, Japan

[21] Appl. No.: 552,465

[22] Filed: Nov. 9, 1995

[30] Foreign Application Priority Data

| Nov. 9, 1994 | [JP] | Japan | 6-274697 |
| Nov. 9, 1994 | [JP] | Japan | 6-274698 |
| Oct. 17, 1995 | [JP] | Japan | 7-268403 |

[51] Int. Cl.$^6$ ............................................. G06F 17/00
[52] U.S. Cl. ............ 364/478.02; 182/156; 182/159; 182/160; 182/161; 182/162; 182/163; 505/829; 505/830; 395/702
[58] Field of Search ............ 364/478.02, 140; 439/586, 590, 591; 182/156, 159, 160, 161, 162, 163; 280/47.28, 47.29, 47.27; 505/829, 830, 831; 395/702

[56] References Cited

U.S. PATENT DOCUMENTS

| 4,459,663 | 7/1984 | Dye | 395/229 |
| 4,512,747 | 4/1985 | Hitchens et al. | 434/428 |
| 4,542,808 | 9/1985 | Lloyd, Jr. et al. | 186/56 |
| 4,678,390 | 7/1987 | Bonneton et al. | 414/282 |
| 4,783,740 | 11/1988 | Ishizawa et al. | 395/228 |
| 4,932,828 | 6/1990 | Katae et al. | 414/286 |
| 5,241,467 | 8/1993 | Failing et al. | 395/201 |
| 5,403,147 | 4/1995 | Tanaka | 414/786 |
| 5,582,497 | 12/1996 | Noguchi | 414/281 |

Primary Examiner—Reba I. Elmore
Assistant Examiner—McDieunel Marc
Attorney, Agent, or Firm—Dickstein Shapiro Morin & Oshinsky LLP

[57] ABSTRACT

The disclosed is a method comprising the steps of displaying entirely a plurality of storehouse facilities in the form of a plan view; informing a storage abnormality when the actual storage location and stock condition are different from that displayed in parallel with displaying the stock condition at each instant; and correcting the stock condition at the time the storage abnormality is informed. Shelves are distinguished using displayed figures in accordance with shelves in which already stored, shelves still remaining empty, and shelves for which storage is prevented; and the stock condition of the storehouse facilities is displayed by specifying any of the facility on the displayed surface.

8 Claims, 18 Drawing Sheets

FIG.5
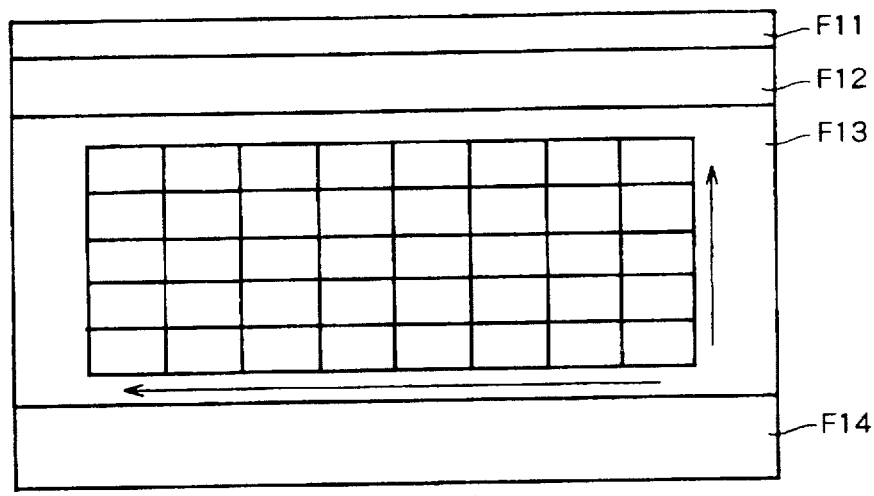
FIG.6 (a)  FIG.6 (b)  FIG.6 (c)
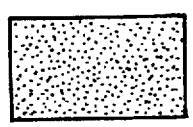 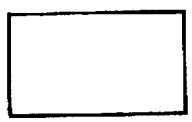 
FIG.6 (d)  FIG.6 (e)  FIG.6 (f)
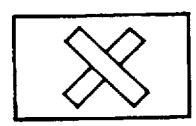 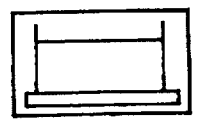 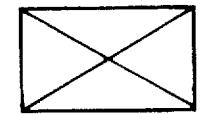
FIG.6 (g)
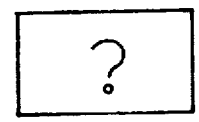

5,757,650

1

METHOD OF CORRECTING STOCK CONDITION IN AN AUTOMATED STOREHOUSE CONTROL AND APPARATUS THEREFOR, AND METHOD OF CORRECTING CONVEYANCE STATE OF PARTS AND APPARATUS THEREFOR

BACKGROUND OF THE INVENTION

1. Field of the Invention

The present invention relates to a method of correcting stock condition and conveyance state in an automated storehouse and apparatus therefore, and more particularly of correcting stored state and conveyance state of production component parts on a real time basis.

2. Brief Description of the Prior Art

In an automated storehouse control for definite number control, a predetermined quantity of component parts necessary for assembling vehicles are stored and these parts are supplied to production lines quickly at the required time. In order to continuously perform store-in and delivery-out of a variety of component parts of various kinds and shapes, such parts are necessary to be automatically conveyed and stored within the space of suitable shelves, and also the desired parts should be fetched and conveyed to be delivered.

These component parts are of extremely the diversity of sorts, among which even e.g. RV's are also included, ranging from miniature parts to the large-sized parts such as bumpers; and accordingly, the specification of which, as reflected by the recent increased demands, is divided with an extreme diversity in accordance with the delicate painted colors, or depending on worldwide targeted countries having, especially, different security standards from each other.

It is also important to successively deliver instructions, and the storehouse facilities maintain connected function, and, in addition, further important is that the error of conveyance state is corrected, as operators continue to supervise, instruct necessary to be corrected and various methods of correction have been proposed.

FIG. 17 is a schematically perspective view of a typical automated storehouse system for controlling the stored condition of component parts, by controlling storehouse facilities of a production plant.

As shown in FIG. 17, the automated storehouse system consists of a plurality of storehouse facilities 1, a storing conveyer 2a as the conveyance equipment for performing storage and delivery of component parts in order to be received in and taken from each shelf 6 of the shelf equipment of storehouse facilities 1, a delivery conveyer 2b, and a control device 3 for controlling the operation of both the conveyers 2a and 2b.

In the conveyance facilities, the storing conveyer 2a and delivery conveyer 2b are installed upstairs and downstairs, respectively.

Each of parts is placed on a pallet, stored through an inlet 2c of a storing conveyer 2a, received in a desired location of the indicated storehouse facilities 1, taken out from a separately indicated location, and delivered through an outlet 2d of delivery conveyer 2b. A lift 4 is provided for communicating outlet 2d with inlet 2c.

FIG. 18 illustrates specifically the storehouse facilities 1 in FIG. 17.

The facilities 1 having an automotive transporter 11, in which a plurality of parts shelves 12 are arranged to form a bank, e.g. forming a bay 1a (arrow symbol) at the lateral

2 position, and a level 1b (arrow symbol) at the vertical position, adapted to receive production parts into a predetermined parts shelf 12a.

Automotive transporter 11 carries the parts through a pallet 13, conveys along a track 15 from storing and delivery conveyers 2a and 2b to a predetermined lateral position of shelf 6, and the parts are lifted by means of an elevator, not shown, up to an indicated shelf 12a to be stored.

FIG. 19 is a block diagram generally, functionally illustrating a control system for the automated storehouse shown in FIG. 18.

This control system is comprised of a sequence control device 31 for controlling the entire sequence relating to storage and delivery operations of parts, a conveyance control device 32 for controlling the conveyers 2a and 2b, and instruction or indicator device 33 for delivering instructions with monitoring the proceeding of storage and delivery operations.

The sequence control device 32 includes, in addition to a controller for controlling the sequence itself, an input/output interface 31a to deal with input and output, a telecommunication interface 31b to deal with the communication with a support system, not shown, for perform supporting the automated storehouse system, and a management unit 31c which universally manages the interfaces 31a and 31b, recognizes each state of storehouses by introducing the state information thereof, and creates and transmits the control data; thereby the storage and delivery conveyers 2a and 2b are controlled through the conveyance control device 32, and each of automotive transporters 11 . . . are introduced through the introduction control device 14.

An indicator device 33 is connected via the I/O interface 31a to the management unit 31c to instruct the storage and delivery operation with supervising the sequence control of storage and delivery, and operated by an automated storehouse control software.

FIG. 20 is a flow chart illustrating a general procedures for the automated storehouse of FIG. 19. The control thereof for the automated storehouse is comprised of a setting-up step (Step S1) for setting up in advance the items to be managed by indicator device 33, an indication step (Step S2) for indicating the parts to be stored in or delivered from the storehouse through the indicator device 33, a control step (Step S3) for controlling the sequence relating to the items to be managed according to the storage/delivery instruction, and an updating step (Step S4) for updating the items on the basis of the result of the sequence control, thereby performing operations of each construction of the automated storehouse to carry out the parts storage control.

The managed items include information representing the specification relating to the configuration of parts, and shelf data representing the stored state in the parts shelves 12.

FIG. 21 is a flow chart specifically illustrating the control process of the sequence of step S3 shown in FIG. 20.

The control process S3 includes:

a setting-up process of conveyance state step (S31) for deciding tracking path of conveyers to form a conveyance state and setting-up thereof in the management unit 31c;

an obtaining process step (S32) for obtaining a structural state of action;

a final path determination step (S33) for determining whether the entire path can have been thoroughly passed;

an error inspection step (S34) for determining the existence of any error relating to the sequence in the above process;

a displacement of the conveyance region process step (S35) for proceeding the sequence control, displacing the products in accordance with the actual movement of the storehouse facilities, and, according to the indicated location on display 33, moving the conveyance state to the next conveyance region S on the path;

a completion process step (S36) for moving both along the established entire path to complete the storage/delivery job; and an interruption process step (S37) for interrupting a sequence which is just controlled.

At the determination step S33 for final path above, when the entire path has been already passed, the completion of storage and delivery operation of S36 is performed; and if there is found any error at error inspection, the interruption of sequence of S37 is performed.

These large scale scheme is to sense the positional relationship associated with movements of the automotive transporter 11 and storage and delivery conveyers 2a and 2b by means of a plurality of control switches utilizing mechanical contacts or optical sensors. Owing to the sensing error, sometimes the actual state of movements is different from the displayed movement represented on the indicator device 33.

Also, in addition to the sensing error, for reasons of precedence of sequence control or the accumulation of the sensing errors themselves, sometimes the status remains no longer a simple difference of the actual movement conditions, and rather it is forced to displace the parts themselves with the manpower by the operators using automotive transporter 11 or conveyers 2a and 2b.

In addition, in case that the difference mentioned above can frequently occur, the necessity may occur to replace either of the automotive transporter 11 or conveyers 2a and 2b which is or are assumed to cause the trouble with a reserved one. This becomes also different from the movement indication. In such a case therefore, the difference should be represented by the indicator device 33 to be corrected, and FIG. 22 is a flow chart representing an example of conventional correction method for correction of the conveyance state in the process of FIG. 21.

Such a conventional method comprises a determination step S371, for determining, during the interruption of sequence in Step S37, whether the present mode is a correction mode in which a job for correcting the conveyance state may be started; and for determining, if determined the job not to be started, performing a determination of a corrected mode by which another job can be performed;

a process of correction content indication step (Step S372), for indicating the content to be corrected by indicator device 33; and a management items re-setting-up step (Step S373), for newly set up the conveyance state in response to the requirements of management In addition, Step S370 is the step to initiate a job to be corrected, and Step S379 the step to execute another job. (Problems to be solved)

In this connection, there have been the following problems when attempted to coincide the actual stored state with that displayed on the display device:

(1) Other than the difference of the conveyance state, when the actual stored state is different from that being displayed, such difference could not be easily understood and corrected by the operator.

(2) Sometimes it takes a long time for the operator to comprehend and interpret the indication of the stored state, as is normally displayed by a digit or figure, and to gain a better understanding by replacing it to the actual state of the automated storehouse, and also likely to cause misreading or misinterpretation before he becomes familiar with the necessary operation.

(3) Also, even though the stored state and the present position are properly comprehended, as the indication for the correction is formed by a series of letters, digits and symbols representing the new stored state and position, it is troublesome and time consuming for the operator to review the displayed content.

(4) Further, to practically instruct the considered content is to enter a series of letter array, therefore this is also troublesome and can cause a key entry error.

Also when, by applying the method of correcting the conveyance state, it is attempted to let coincide the actual movement state of the automotive transporter and conveyers with the displayed movement state, there have been also the following problems:

(5) The movement indication on the display means, in which the present position relating to the conveyance state is displayed by a digit or figure as it is, sometimes it took a long time for the operator to comprehend and interpret the indication, and to gain a better understanding by replacing it to the actual state of the automated storehouse, and also it was likely to cause misreading or misinterpretation before he becomes familiar with the necessary operation.

(6) Also, even though the conveyance state and the present position are properly comprehended, as the new conveyance state and position were entered by the key operation of letters, digits and symbols, sometimes it took a period of time for the operator to comprehend the content and perform such key entry, and it was likely to cause any mistake of comprehension or of key operation.

(7) Also, the new conveyance state and position after correction, at indicating by entry of the key operation of a series of letter arrays, mistake of key operation was likely to be introduced.

For the reason of the problems (1) to (7) above, the acute requirements from the production lines have not been sufficiently responded.

SUMMARY OF THE INVENTION

In view of the above-described problems, the present invention has been made. Accordingly, an object of the invention is to provide an improved method of correcting stored state and conveyance state in an automated storehouse and apparatus therefore, and more particularly of correcting stored state and conveyance state of production component parts on a real time basis; and also to provide an apparatus therefor.

A method of correcting a stored condition of an automatically controlled storehouse according to the present invention is, in a method of correcting, as necessary, the stored condition of component parts, comprised of applying specification information to specify production component parts;

monitoring the state of parts being stored in view of storehouse facilities in conjunction with said specific information; and displaying entirely a plurality of storehouse facilities in the form of a plan view for successively showing the stored state at each time point. The method also includes the steps of informing a storage abnormality of the stored position and stored state when it is different from that indicated, and performing correction on the stored state which is informed as above.

Also, in the above method of correction on the stored state, the stored state is distinguished between the already stored shelf, a shelf still remaining empty, and also a shelf prevented from stored or delivery by assistance of a displayed figure.

Again, in the method of correction above, correction is enabled by indicating a selected shelf and displaying a specification information of parts stored therein.

The correction apparatus for the stored state in an automated storehouse, by which the stored state of component parts in storehouse facilities of the automated storehouse is corrected as necessary, comprises entry means for specifying the component parts by entry of specification information.

means for monitoring the stored state of parts by correlating the storehouse facilities with the specification information, and display means for entirely displaying a plurality of storehouse facilities in the form of a plan view to illustrate in succession the stored state at each point of time. The apparatus also includes means for informing an abnormality of the stored state when the stored location and stored state are different from that being displayed, and means for correcting the stored state for which any abnormality of storage is informed.

The present invention is to provide a correction method of the conveyance state in an automated storehouse of the invention, more specifically for correcting as necessary the stored state of component parts in storehouse facilities of the automated storehouse comprising the steps of:

specifying the component parts by entry of specification information, monitoring the stored state of parts by correlating the conveyance paths of the parts with the specification information, and displaying entirely the conveyance paths in the automated storehouse in the form of a plan view to illustrate in succession the stored state at each point of time. The method also includes the steps of informing an abnormality of the stored state when the stored location and stored state are different from that being displayed, and correcting the stored state for which any abnormality of storage is informed.

In the correction method of conveyance state above, the invention also provides the step of correction including displaying the conveyance state of conveyance paths to be corrected at each point of time, correcting the shelf location or specification information when the parts are stored, and in priority correcting the order of storing entry or correcting the specification information when the parts are delivered.

Also, in the correction method described above, the step of correction is performed in connection with displaying a conveyance path to be corrected and a conveyance state associated with an arbitrary conveyance path.

According to another aspect of the invention, the correction apparatus for the conveyance state in an automated storehouse, by which the conveyance state of component parts in storehouse facilities of the automated storehouse is corrected as necessary, comprises entry means for specifying the component parts by entry of specification information, means for monitoring the conveyance state of parts by correlating a plurality of conveyance paths with the specification information, and display means for entirely displaying the conveyance paths of the parts in the form of a plan view to illustrate in succession the conveyance paths at each point of time. The apparatus also includes means for informing a deviation of conveyance when an actual location and the conveyance state are different from that being displayed, and means for correcting the conveyance state at the point of time when such deviation is informed.

BRIEF DESCRIPTION OF THE DRAWINGS

FIG. 5 is a displayed image of stock condition at the storage state modification step;

FIGS. 6A–6G is a descriptive illustration of each of symbolized figures;

DETAILED DESCRIPTION OF THE INVENTION

Figure 1:
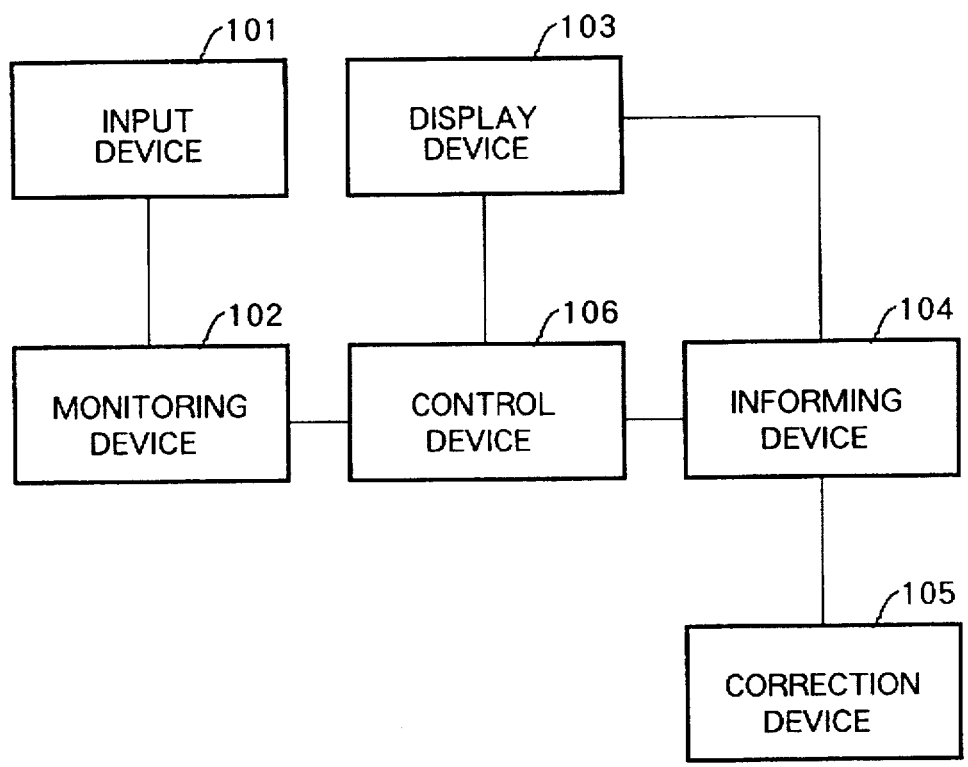
FIG. 1 a fundamental schematic diagram of a correcting apparatus of the stored state in an automated storehouse.

In accordance with the present invention, a correcting apparatus of the conveyance state of component parts in an automated storehouse for an automated storehouse system, illustrated in FIG. 1, can be described as a series of steps 101–105.

FIG. 1 is a block diagram illustrating a fundamental construction of a correcting apparatus of the stored state in an automated storehouse. The apparatus is applied for management of component parts at the storehouse facilities in an automated storehouse. Into the apparatus, the specification information relating to component parts is supplied to specify these parts; the stored state thereof is monitored under taking correlation of the storehouse facilities with the specification information above; and in parallel thereto the stored state is corrected as necessary.

Each of reference numerals represents as follows: 101 is an input device, 102 a monitoring device for monitoring the stored state under correlation of the storehouse facilities with the specification information, 103 an display device for entirely displaying the storehouse facilities in the form of a plan view, wherein the stored state at each point of time is displayed in succession.

An informing device 104 is to inform when the actual location and the stored state is incorrect, that is, when the stored state on each parts shelf in the storehouse facility is different from that displayed on the display device, a correction device 105 is to correct the stored state when the abnormality is informed, and a control device 105 is to control each device above.

Figure 2:
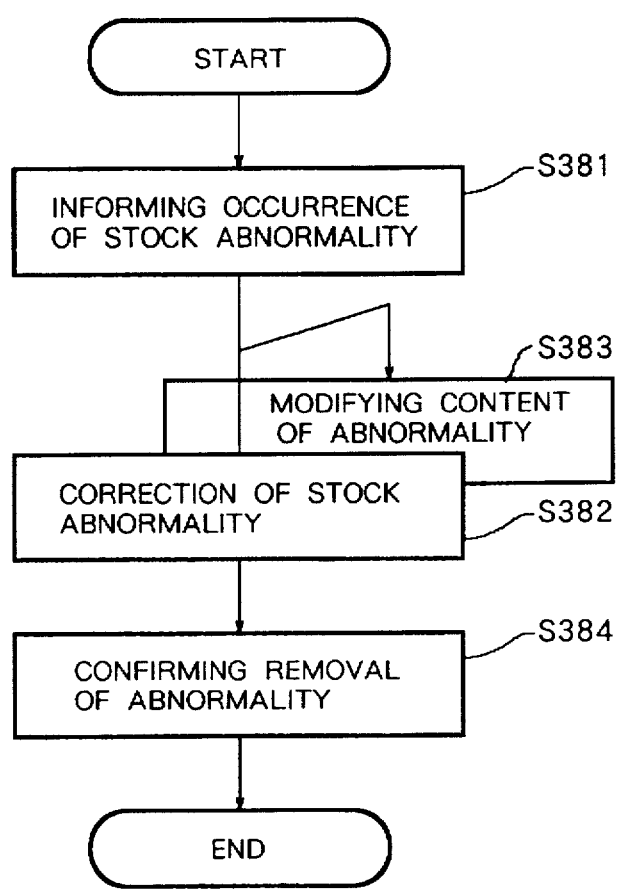
FIG. 2 a flow chart illustrating the flow of a correction process by the apparatus in FIG. 1.

FIG. 2 is a flow chart showing the flow of correction process by the apparatus in FIG. 1.

The correction process comprises the abnormality occurrence informing step (Step 381) for informing the occurrence of the aforementioned abnormality of the stored state; the stored state abnormality correcting step (Step 382) for indicating a correction of the stored state; the stored state content modifying step (Step 383) for modifying the content of the stored state; and the stored state abnormality elimination confirming step (Step 384) for confirming the abnormality of the stored state having been eliminated.

At the information Step 381, either one step is chosen among the information step Step 382 and the modification Step 383 by the operator, in other words, performed alternatively.

The abnormality informing step periodically determines an error flag which turns on upon occurrence of a sequence error. Therefore, it may be started by an interrupt or the like process.

By initiation of the process, the operation of the storehouse facilities is displayed to inform the operator the occurrence of the sequence error and the facility where such error has occurred, and to demand selection of a specific method of correction; the operator may distinguish to modify the flow of process, that is, to perform either one of Step 382 and Step 383.

The step of storage abnormality correction symbolically displays the specific content of the storage abnormality to indicate the operator the troubled position and structural status of such a trouble, and demands the recovery from the trouble of the sequence control, and accepts the operator's instruction for recovery to correct the storage abnormality.

The modification Step 384 displays an image of the stock condition in a specified storehouse facility 1 to indicate the shelf location where a trouble has occurred to the operator to demand selection of the shelf, and receives the operator's instruction to display the overall content of specification of the component parts to modify the content of specification at the selected one of storage shelves.

Step 384 for confirmation of elimination of abnormality compares the status after correction or modification by the operator with that of the original erroneous state to confirm elimination of the storage abnormality: and re-initiates the interrupted sequence control, when determining the elimination; but returns the flow to Step 381 of information of storage abnormality occurrence, if determined not eliminated, to repeat the above process.

Figure 3:
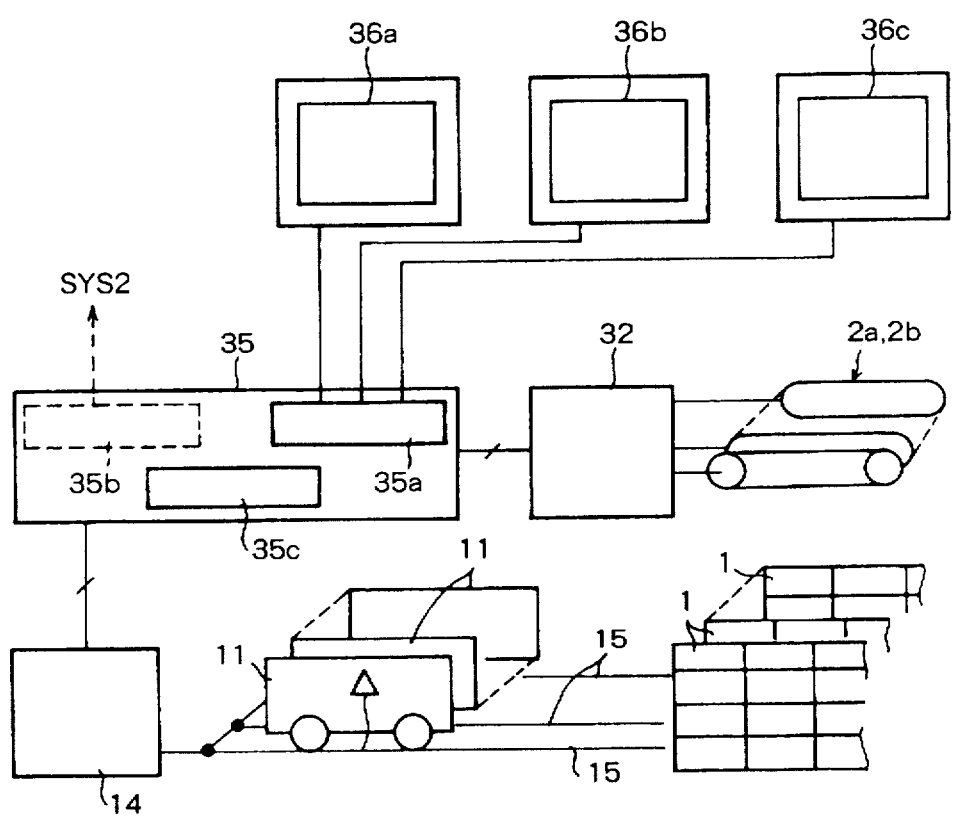
FIG. 3 is an outlined schematic illustration of an embodiment of the apparatus.
Figure 19:
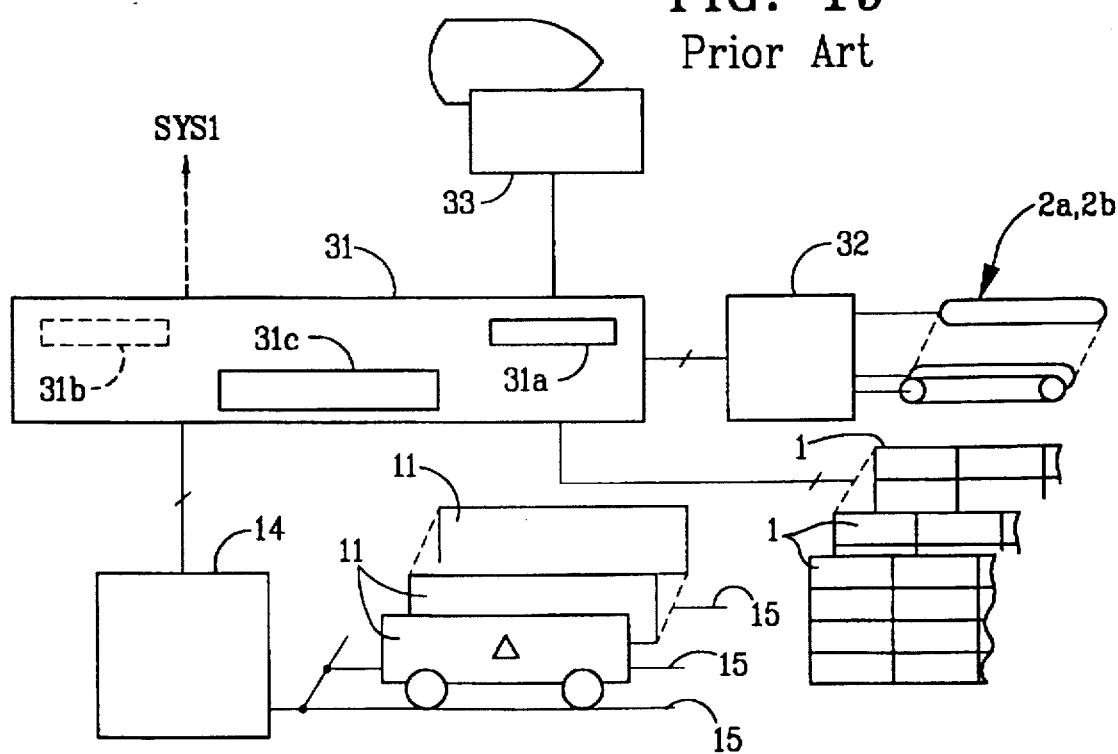
FIG. 19 is a schematic diagram of a control system in FIG. 18.
Figure 20:
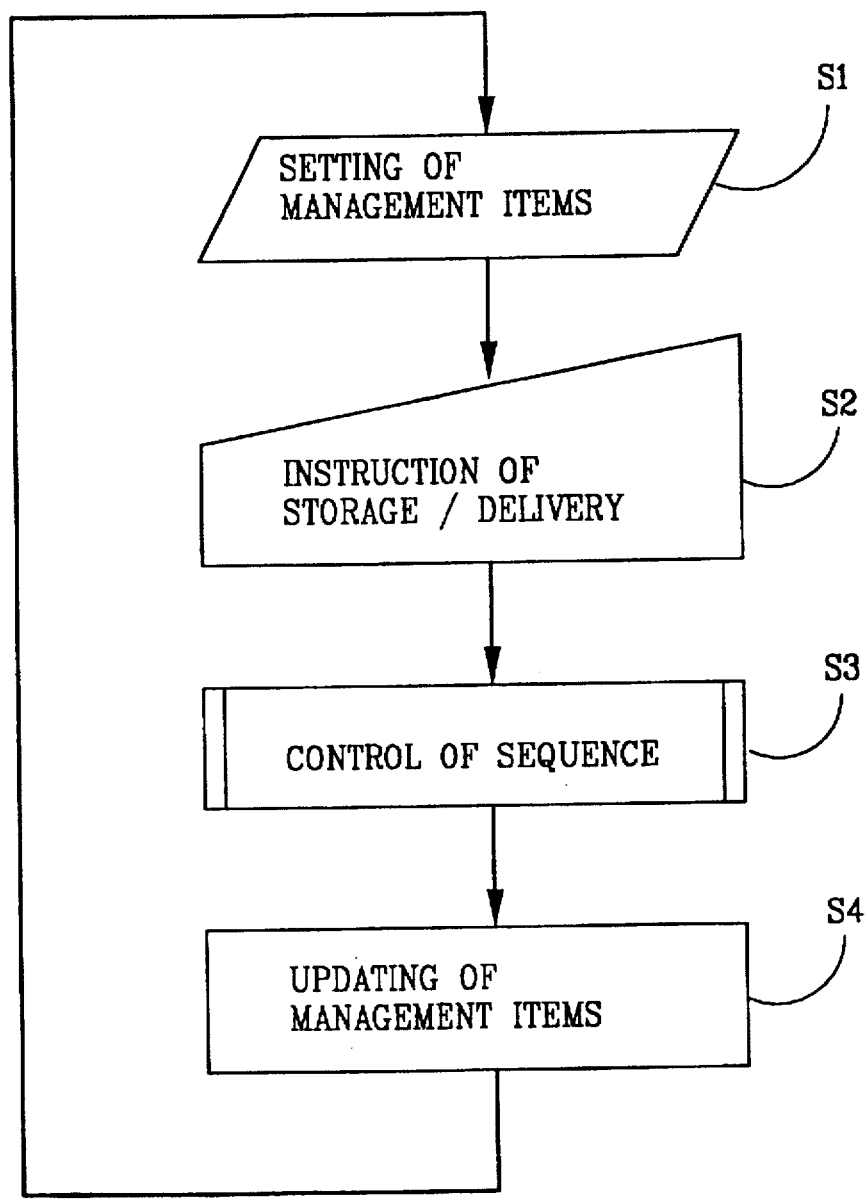
FIG. 20 is a flow chart illustrating a typical procedure.
Figure 21:
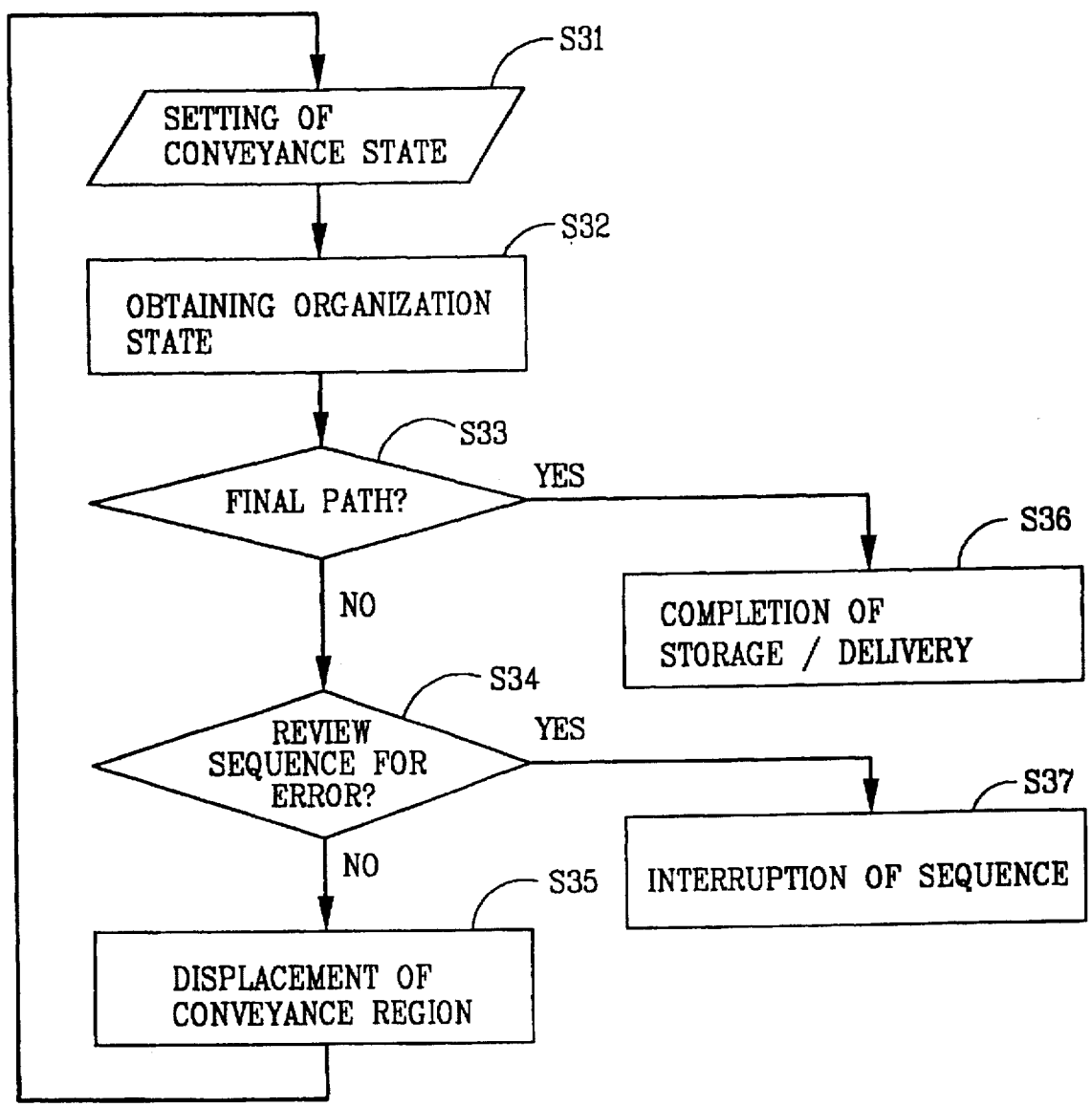
FIG. 21 is a flow chart of a sequence control step in FIG. 20.
Figure 22:
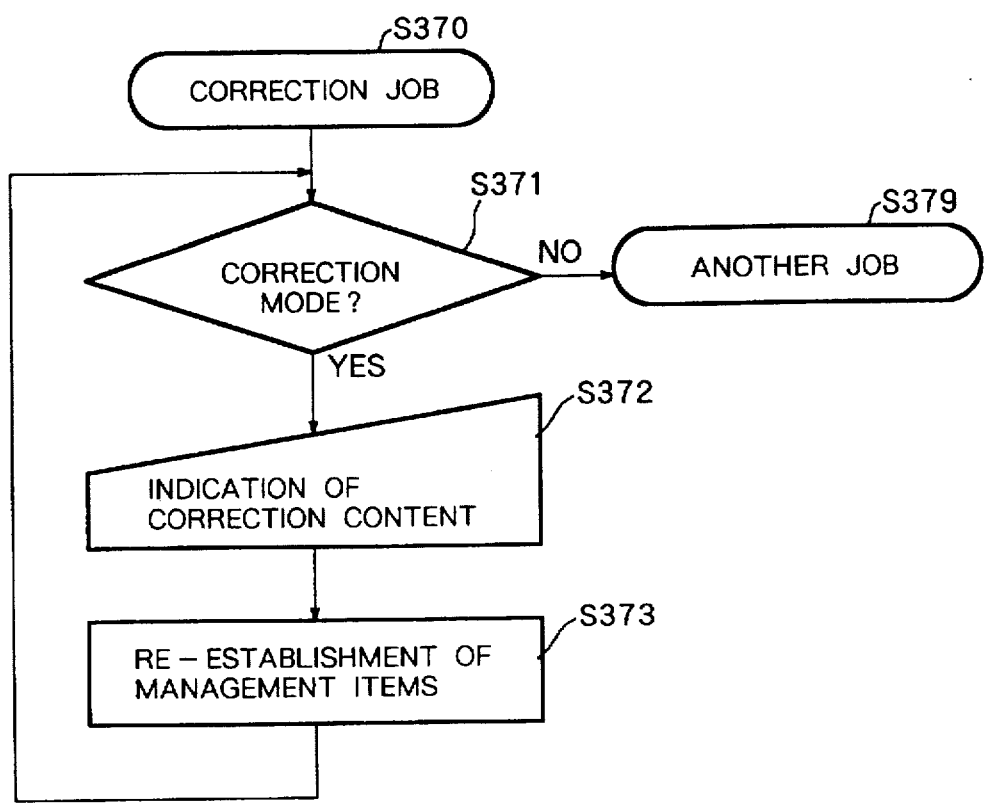
FIG. 22 is an example of the conventional correction method.

FIG. 3 is an outlined schematic illustration of the embodiment of the apparatus shown as a separate function basis. The main structure thereof includes a second sequence control device 35, and second display device 36a, 36b and 36c comprised together, the other components being the same as those in the prior art embodiment of FIG. 19.

The second displays 36a, 36b and 36c each displays a figure showing the specification of the work as products and control status of the storehouse facilities according to a predetermined form, and enters the specific location and the content of the management work to the second sequence control device 35, and indicates by pressing on the corresponding figure portion for the operator to confirm the control status to take operation relating to storage and delivery of the work.

One of the second displays 36a, 36b and 36c is installed at the storage inlet 2c, another one at the delivery outlet, and the remaining one is used for the overall monitoring and kept as a preventive device; thus each of storage, delivery and correction operation of the stock condition can be performed separately from each other.

A dual use of a display can be performed by using one or two displays. Also, in the case of combined uses, four or more devices can be used.

More specifically, it is composed of a well known touch panel or touch screen having a CRT or a display of LCD: an initial setting of a plurality of pictures to design an arbitrary figure, and senses pressing-on of each divided region by the operator to form an instruction corresponding to such divided region to transmit the instruction. Also, any type, in which a contact of any part of the operator's body can provide instruction for the automated storehouse system, may be used as necessary.

The figures may be constructed as each portion thereof may be instructed by a touch by the body of the operator on each area of the displayed programmable pictures.

The second sequence control device 35 includes an input/output interface 35a for receiving from displays 36a, 36b and 36c an instruction of storage/delivery to inform the control status of the automated storehouse; a communication interface and a management device 35c.

More specifically, device 35 is composed of a known sequence control or sequencer or the like, but alternatively another device having any programmable control means may be used.

The new reinforcement system, except for having any software for monitoring developed for the use of sequence controller 35 and second display devices 36a, 36b and 36c, is not different from the conventional reinforcement system.

The above second interface 35a has an input/output buffer, receiving the operator's instruction as indicating the species of the displayed picture associated with each of the second display devices, and serves to connect each I/O buffer to the second management device 35c through a multiplexer that allocate the indication of these species for each display and collecting the reception of the indication from each such display device.

The second management device 35c includes an application program, which is comprised of a storage/delivery instruction part for receiving the instruction, with managing the stock condition, to display the same, and a state monitoring part that monitors and manages the working status; and the device 35c is connected to a second communication interface 35b via a common memory.

The above status monitor, upon occurrence of conveyance deviation or storage abnormality, implements an interrupt in accordance with the storage/delivery instruction part to initiate correction of such occurrence, and also can implement such correction separately as necessary by the operator's instruction.

Hereinafter, it is described the display figure to be displayed on the second display devices in FIG. 2 at each step of FIG. 2.

Figure 4:
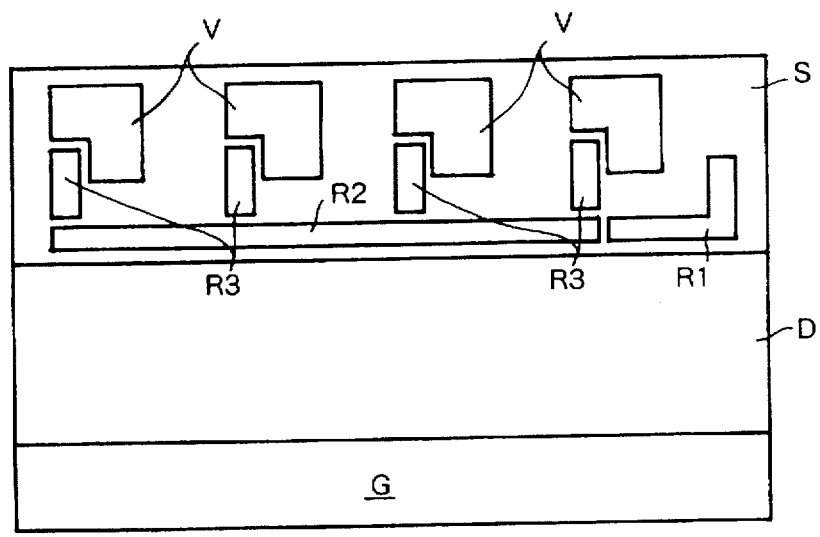
FIGS. 4A–4B is an illustration of operation of the facilities displayed on the second display device.
Figure 4:
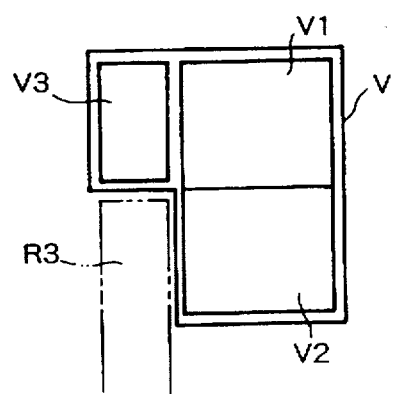

FIG. 4 is a displayed figure of the operating state of storehouse facilities on second display device. FIG. 4(a) is the entire view of the storehouse facilities, and FIG. 4(b) is a partially enlarged view of the storage part in FIG. 4.

The displayed figure displaying the operating state of the storehouse facilities includes a partial figure S for displaying the facility into which parts are to be stored; another partial figure D for displaying the facility from which the parts are to be delivered; and a further figure G for displaying a guidance for explaining the operation at the latter figure D, in order to permit the monitoring operation to be performed from both the storing side and delivery side relating to the facilities.

The partial figure S for displaying the facilities subjected to storing includes: an introducing path R1 for introducing pallets, a distributing path R2 for distributing the pallets, introducing paths R3 for replacing the pallets to a automotive transporter, and receiving paths V for the transporter to select a shelf to store the pallets.

The partial figure D for displaying delivery is the same as the above storage displaying figure S, except that: replacing the storage operation with the delivery operation; replacing the storage conveyer with a delivery conveyer to reverse the movement direction of pallets; in addition, replacing the introducing path R1 with an outlet path; replacing the distribution path R2 with a confluence path; replacing the guide paths R3 ... with transmitting paths; and replacing the storing paths V ... with attaining paths.

In these introducing path R1, outlet path, distribution path R2, guide paths R3, and transmitting path, the operating status of each of conveyance facilities is distinguished between the normal operation and the trouble/stopped condition from each other such that the trouble/stopped condition is emphasized by means of e.g. a warning color (yellow, orange or red), or a flashing, or by a symbolized letter of "operation" or "trouble".

The partial figures S and D may be separately used for indication of the facilities into which to be stored or from which to be delivered. Also, one of which may be in use for indication of the conveyance state based on the sequence which is set by the instruction of storage/delivery, while the other may be for indication of the location of the shelf into which parts are to be conveyed, and the stock condition in the storage facilities.

The storage paths V, ... and obtaining paths in FIG. 4 (b) each includes: a column V1 of instruction shelf for, by representing the values of the bay and level mentioned above, representing the indicated storage shelf; a transporter indicating columns V2 of indicating distinction of storage/delivery and the identification number of the automotive transporter; and a bank indication column V3 for numerically representing the bank in which the storage/delivery instruction is set up: thereby representing the practical scheme of the automated storehouse system, and indicating the existence/absence of a storage/delivery instruction in each "aisle" and the instructed storage shelf.

Also, it is adapted that, by pressing on the displayed figure in the column V1 or V2, a picture image is displayed which represents the stock condition of the corresponding bank, in the case of a storage instruction; while, in the case of a delivery instruction, another picture image is displayed which represents the content of trouble of the corresponding bank.

FIG. 5 is a summary illustration of the stock condition in the step of modification of the content of the stock condition at the step S 383 of FIG. 2.

Such a displayed image includes:

a title column F11 for indicating the identification number of the corresponding bank and the automotive transporter and declaring a correction operation;

an instruction column F12 for representing the content of storage/delivery instruction corresponding to the identification number;

a storage representing column F13 for specifically displaying the stock condition by a symbolical figure; and an operation guidance column F14 for explaining the correction operation and representing a guidance for promoting a varity of operation instructions.

The instruction column F12 is representative of distinction of the storage/delivery instruction; of the date on which each instruction has been set up; of the location of the instructed storage shelf; and of the specification information of the products stored in such shelf.

The storage representing column F13, by laterally arranging the numerical value of the bay and vertically arranging the value of the level, is representative of the location of each of storage shelves in a matrix form; and, by allocating a symbolized figure for each location, is representative of the stock condition; thereby allowing the operator to immediately, visually presume each of the actually stored products.

Finally, the operation guidance column F14 above displays, with representing the meaning of each symbolized figure and each guidance, in addition, indicating keys including one for an automotive transporter to alternately select either one of banks on the opposite sides of the array, an the other for changing over to the figure of representing the stock condition. FIG. 6 illustrates each of the symbloized figures.

The figures in FIGS. 6(a) to (g) are representative of:

(a) an actual shelf to be actually stored by parts;

(b) an empty shelf evacuated by any parts;

(c) a reserved shelf reserved for the parts to be stored therein;

(d) a defective shelf not in use for storage due to a mechanical failure;

(e) a shelf having an empty pallet without enclosing products;

(f) a location where no shelf is provided due to a structual limitation; and (g) a doubly instructed shelf to which an erroneous instruction is applied for an already storage-instructed shelf.

Each figure above is provided with a corresponding colored pattern: for example, an actual shelf with an unremarkable symbol; an empty shelf possible to be stored with a remarkable color; and, an empty pallet with a psoudo pattern to indicate not a stored part, but a pallet data.

A reserved shelf is symbolized by a keep bottle for clear indication of "already reserved", and a doubly stored shelf is represented by a quenstion mark for indicating that a correction of sequence is demanded, further includes a defective shelf with a pattern of blockage to indicate the refusion of storage; and a location where no shelf is provided with a cross symbol to indicate no space to be stored.

Figure 7:
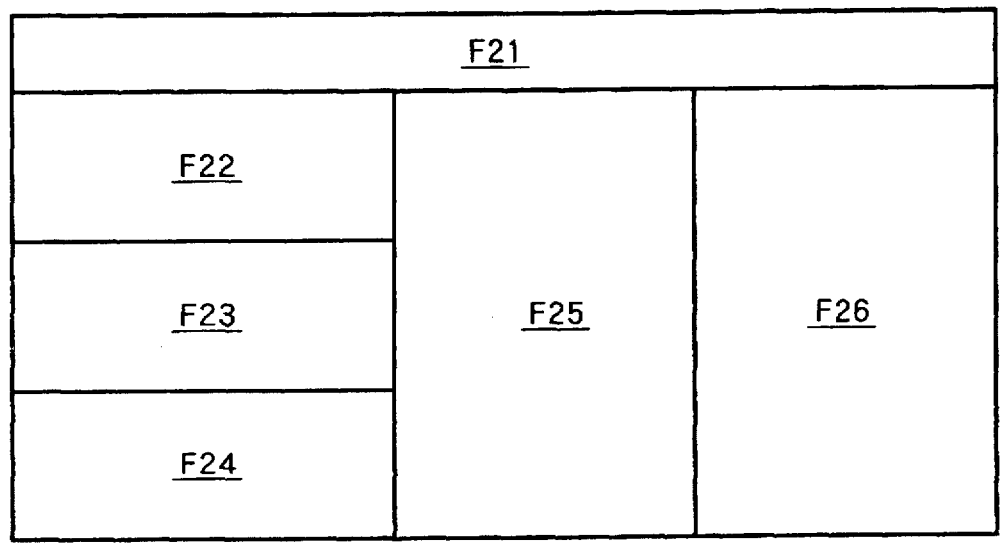
FIG. 7 is a descriptive illustration necessary for modifying the content of storage state.

FIG. 7 illustrates a figure for modifying the content of the stock condition in FIG. 5, which figure includes a title section F21, a model section F22, a shipping target indicating section F23, a masking section F24, a colored section F25, and an operation selection section F26, thereby the content of various specifications is displayed and can be selected as to each of parts to be stored, and also the content above at the present instant is operated and modified in parallel with the content being confirmed.

FIG. 3 to FIG. 7 are displays to illustrate in detail the procedure of correcting the stock abnormality, the procedure of which is described in the case of an instruction for storage.

As to the flow chart of FIG. 2, when an abnormality occurs, a picture for urging a selection of a correction method is displayed on display device 36a, 36b, 36c; the abnormalty is informed in the manner that either of storage paths V. . . . flashes, when a storage abnormality is of a storage instruction; and, either of obtaining paths flashes, when the abnormality is of a delivery instruction. The operator presses on the corresponding figure according to whether the trouble is of a storage instruction, or of a delivery instruction.

A figure of FIG. 5 is displayed at the step S383 of modification of the storage state, concerning the automotive transporter corresponding to the pressed figure, in which step, the pattern of a shelf where a storage abnormality just occurs is indicated. The operator visually confirms the storage abnormality by the flashing pattern, and depresses a correction key when an immediate modification of this shelf is performed; and, when a corrction of another shelf is to be prioritized, he first presses on the pattern of such another shelf and then depresses the correction key.

Such depression causes a picture of FIG. 7 to be displayed, the data content at the present instant is confirmed by the by the title section F21 as to whether of storage or of delivery instruction, and these is compared with the actual parts to be instructed for modification and the column of the corresponding specification item is pressed.

Finally, the data content corresponding to the key depression above is displayed in title section F21, therefore the operator confirms this and depresses the decision key in the operation selection device to modify the storage state content.

The operation at delivery instruction is the same as that of storage instruction described above.

In FIG. 4 specifically illustrating promotion of the choice of correcting method, even though in a case of other than that caused by a storage abnormality, when in the case of the storage conveyer 2a, each pattern relating to inlet path R1, distribution path R2, and guiding path R3 flashes. In this case, the correction can be performed by another display units 36b and 36c.

As described above, the entire facilities are displayed in the form of a plan view, the stock condition at every instant is shown in succession, a storage abnormality is first informed, the stored state is corrected, and removal of the abnormality is confirmed.

The distinction between shelves already filled, ones remaining empty, and ones prevented into or from which being stored and/or delivered is displayed at least by symbolized figures, and either one of storehouse facilities is specified on the displayed picture, thereby the storage state in the facilities being displayed.

Further, a shelf is arbitrarily selected from a plurality of shelves, and is specified in the displayed picture, and the specification information of the parts in such shelf is displayed and corrected.

Also, the parts can include any of stored parts other than production parts.

Figure 8:
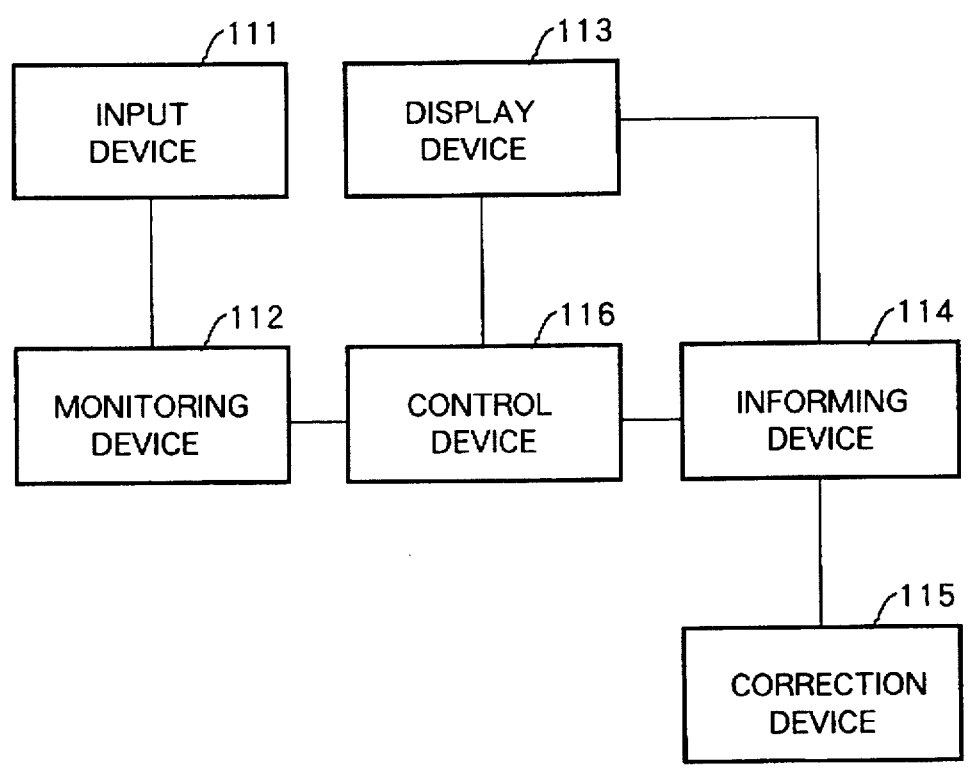
FIG. 8 is a block diagram of a fundamental scheme of an apparatus for correcting the conveyance state of the automated storehouse.

FIG. 8 shows the fundamental structure of a correction apparatus of the automated storehouse, and such apparatus, into which the specification information is entered, specifies the production parts, correlates the information with the conveyance path, and monitors the conveyance state, and, in parallel therewith, corrects the conveyance state.

FIG. 8 includes an input device 111 for receiving a specification information to specify the parts, a monitoring device 112 for correlating a conveyance path with the above information to monitor the conveyance state, a display device 113 for displaying the entire conveyance path in the form of a plan view to successively represent the path at every time instant. In addition, numeral 114 is a conveyance deviation informing device, 115 a correction device, and 116 a control device.

Figure 9:
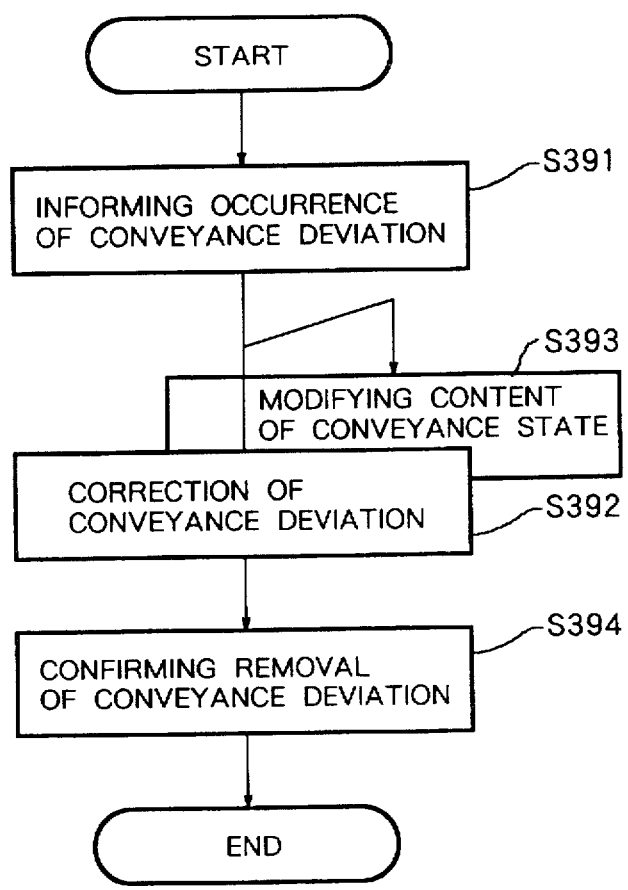
FIG. 9 is a flow chart illustrating the flow of correction process.

FIG. 9 is a flow chart illustrating a flow of correcting treatment by the apparatus in FIG. 8.

The treatment includes an informing step S391, informing the occurrence of the conveyance deviation, a correction step S392, instructing correction of the deviation; and a step S394, confirming the conveyance shift which is removed.

The operator also performs execution of steps S391 to S394, in succession.

Step S391 determines preriodically the error flag which turns on upon occurrence of sequence error to identify the trailing of the flag; and, when the result is an error occurrence, an interrupt may be initiated; then by such initiation, selection of a specific correction method is promoted by displayed picture to inform such occurrence for the operator to distinguish the selected correction method.

Step S392 displays, in a plan view, the entire conveyance paths of the facilities, and indicates the location of conveyance deviation in a specified path to correct the same.

Step S393 displays the specification of parts in a summarized picture form, and indicates the content of the conveyance state to modify the same.

Step S394 displays again the entire conveyance paths in the form of a plan view, compares the former state with the afterward state, and confirms elimination of conveyance deviation; and, when eliminated, S394 restarts the interrupted sequence; while, when not eliminated, returns to S391 of the informing step to perform again the interrupted sequence control at storage/ delivery instruction step.

The function basis construction is the same as that of FIG. 3.

With reference to steps in FIG. 8, the second display inclusive of 36a, 36b, 36c is hereinafter described in detail.

Figure 10:
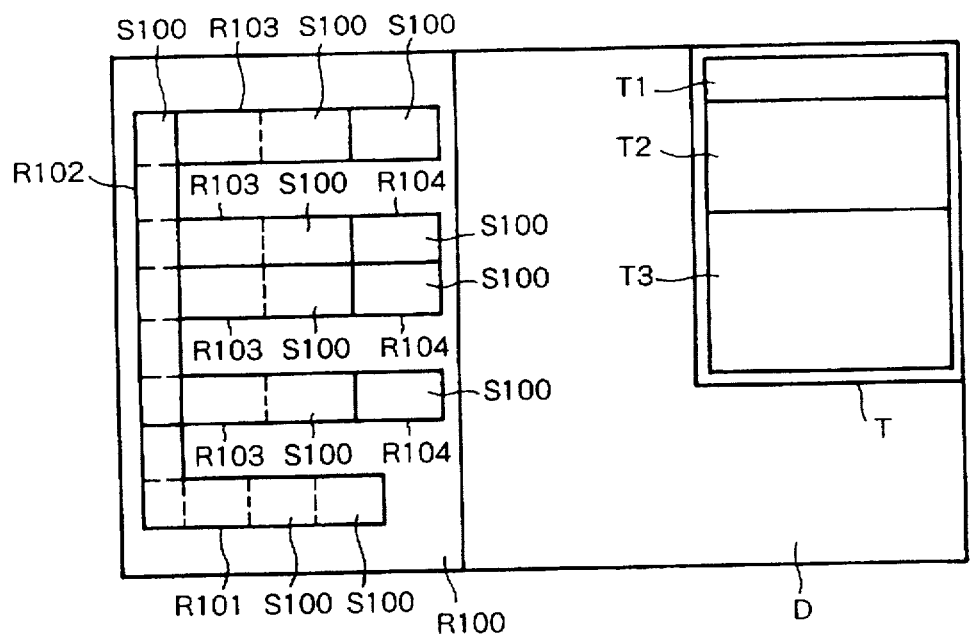
FIGS. 10A–10B is a descriptive illustration of a conveyance path displayed on the second display device.
Figure 10:
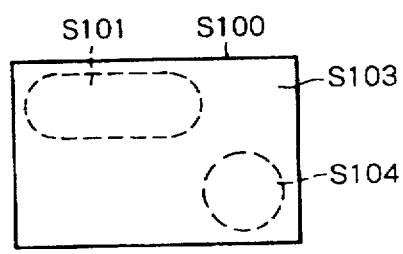

FIG. 10 is a displayed image at the step of occurrence of a conveyance deviation in FIG. 9. FIG. 10(a) illustrates the entire conveyance paths in a plan view form, and 10(b) partially shows a part of the conveyance path in FIG. 10(a).

The displayed image by FIG. 10(a) includes a partial figure R100 for displaying the path itself, a figure T for representing the content, and a figure D for representing the correction indication etc.

On the other hand, in the image of conveyance path also, exept that the form, direction and the content of the path are different, substantially the same figure may be used, and therefore it is described later inclusively at the description concerning the delivery instruction.

The partial image R100 itself includes an outlet path 101, a confluence path R102, an introducing path 103, an obtaining path 104.

Each of paths R101, 102, 103 and 104 is represented as divided in a plurality of conveyance sections S100...S100, and each representation for introducing paths R103 and obtaining path R104 is provided for each of the aisles which are passages between each pair of paths.

In addition, the positional relation between the path for the storage conveyer and the transporter is formed in a plan-viewed figure having configured as the actual configuration to allow for the operator to easily recognize the same.

Partial image T includes a shelf location indication T1 for indication of the shelf location by means of a name or number of the above-described bank, bay or level, a storage/delivery history indication T2 indicating the storage/delivery date and the numbered indicating the order for delivery, and a specification content indication T3 showing the kind of the specification separately in each item by means of a name or number.

Partial image D displays a specific instruction appeared at correction for the conveyance deviation or at modification of the content of conveyance state.

Conveyance sections S100 in FIG. 10(b) each includes a section nomination S101 representing the identification name included in the conveyance section, and a delivery order S102 indicating the prioritized order for delivery within the series of delivery instructions; and indicates, by illumination, the S101 and an indication S103 which serves as the background for the order indication S102.

Pressing conveyance section S101 causes display of the content of conveyance state of the parts placed on a pallet passing the conveyance region, to visually identify the pallet being conveyed, to easily point out parts being stored/delivered to immediately obtain all the necessary information of the parts, thereby allowing the operator, using section T1, to confirm the empty shelf or history thereof, using T2, to presume the manufactured time or stored period, or to predict the delivery time, and, using T3, to perform confirmation of the storage/delivery instruction, and to take reference with the demand from the production line, under referring to the conveyance path.

Figure 11:
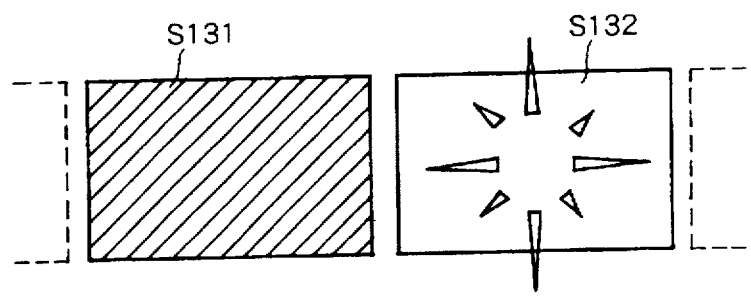
FIG. 11 is a descriptive, partial illustration informing an occurrence of a conveyance deviation.

FIG. 11 is a partial illustration of a conveyance deviation at the conveyance deviation informing step in FIG. 9.

This partial image includes a background S131 indicating the existence of a conveyance state in either one of S100, and a "data existing but with pallet absent" background S132 indicating the state wherein, in spite of the existence of a just conveyed pallet in the conveyance region, there is no conveyance state corresponding to the pallet existence.

In other words, the background S132 declares there is no state to be managed in the corresponding display location in spite of a pallet existing on the conveyer, thereby informing the oprator as to the occurrence of a conveyance deviation as the discrepancy between the operation of the storehouse facilities and management of conveyance state in the sequence control.

The correction operation thereafter becomes easier for the oprator by the nearby displayed figure.

The background S131 may be adapted to illuminate the section 1100, and to flash the "no data" background S132.

Figure 12:
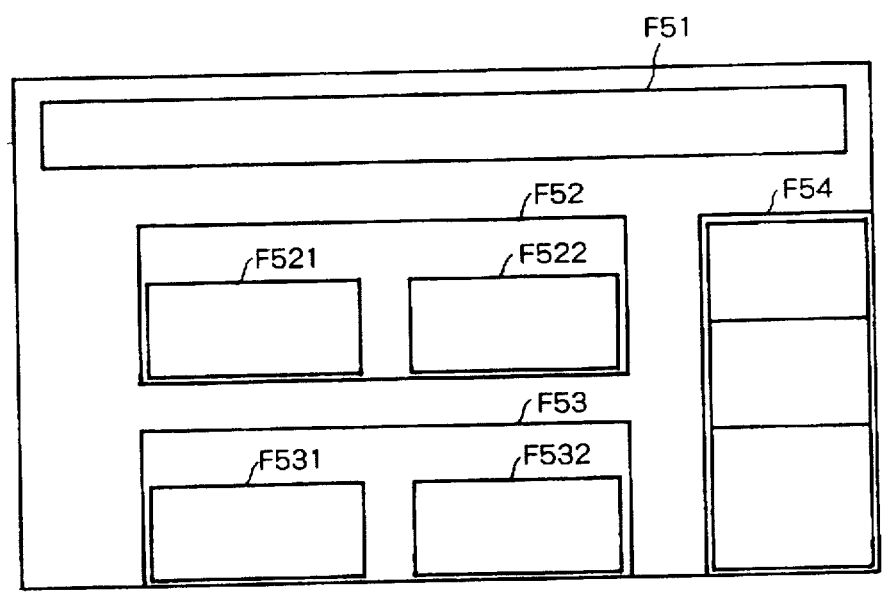
FIG. 12 is a descriptive illustration of promoting a choice of a specific correction method.

FIG. 12 is a displayed figure for promoting the choice of the correction method at the conveyance deviation informing step in FIG. 9.

This image figure includes an indication section F51, a section F52 for correction of storage conveyer, a section F53 for correction of delivery conveyer, and a selection operation section F54 for selecting another image for performing another job, not shown.

The storage or delivery conveyer correction section F51 or F53 includes a conveyance deviation correction key F521 or F531, and a modification key indicationg column F522 or F532, respectively.

Figure 13:
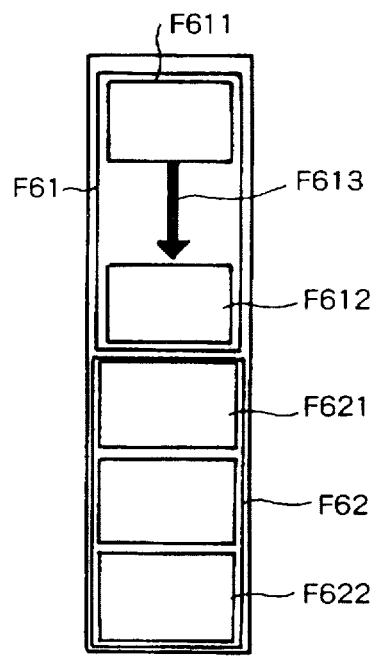
FIG. 13 is a schematic diagram of a figure at a correction process.

FIG. 13 is a figure to represent a window range developed in the corrected image of conveyance diviation at the conveyance deviation correction step in FIG. 9.

This window range includes a section F61 of the object to be corrected, and a correction selection section F62 for selecting the kind of correcting operation, and is partially developed in the partial figure D in FIG. 10(a) and displayed by forming a conveyance deviation correction figure.

The correction object section F61 includes a correction subject section F611, a correction object section and an arrowed section F613 for indicating the direction of correction, thereby allowing the operator to visually recognize the position of correction for conveyance deviation.

The correction selection section 62 includes two indication columns of a correction key column 621 for actually instructing the correction, and a removed key column 622 for instructing a removal of the conveyance state at the location confirmed by correction host column 611.

The displayed pictures in FIGS. 9–13 show the procedure of correcting a conveyance deviation.

When step S391 has informed the conveyance deviation, a picture is displayed on the display 36a, 36b and 36c to urge the selection of a specific correction method; when it is for the storage conveyer, the correction section F52 flashes, while, when for the delivery conveyer, the correction section F53 flashes; thereby allowing the operator to select and press on the deviation correction column F521, F531 or the modification key column F522, F532.

Then, the step S392 displays a correction picture for conveyance deviation and also displays all the conveyance region of conveyance state existing and the region where a coveyance deviation has occurred, thereby enabling the operator to visually recognize and select to press on the region where a deviation occurs. When replacing a conveyance state decided by management with the actual location of a pallet, correction host column P511 and correction guest column F512 at the correction object F61 are specified; while, when removing the conveyance state from the pallet, merely F511 is specified.

The content is displayed in section F61, thereby allowing the operator to confirm the identification number of each conveyance region; when attempting to replace as above, to press on the replacement key column F521, while, when attempted to remove, to merely depress the removal key, thereby to instruct a specific correction method.

Figure 14:
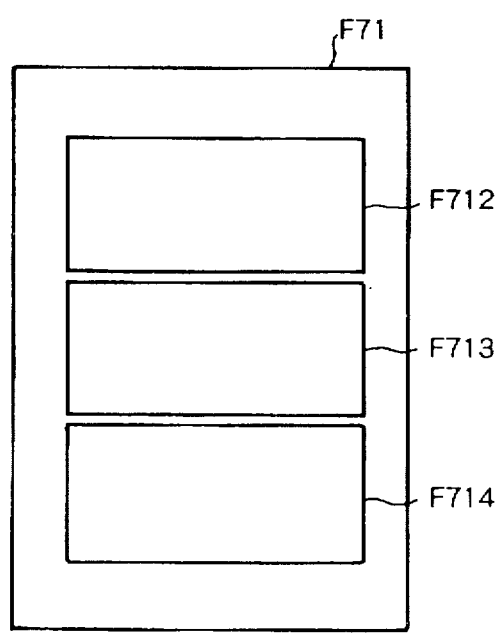
FIGS. 14(a)–(b) together comprise a schematic diagram at a modification step.
Figure 14:
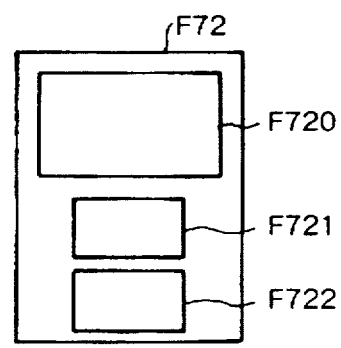

FIG. 14 is a partial illustration for modifying the content of the delivery sequence.

FIG. 14(a) is in use for selection of a kind for the content modification, and (b) for confirming a modification of the delivery turn.

FIG. 14(a) shows a partial image F71, including a column F712 for instructing a modification of the delivery turn, and a column F713 for instructing a modification of each of specification items of the parts during a conveyance state, thereby displaying a partial picture by developing a window.

FIG. 14(b) shows a partial image F72, including a message portion F720 for displaying a message to promote an identification number of a conveyance region to be modified and a confirmation of change of the delivery turn, a column F721 of the key for execution of the delivery turn modification, and a column F722 of a key for taking agreement for displaying the initial picture only, and displays the partial picture by developing a window.

F714 is a key column for interrupting the modification to return the previous picture.

Figure 15:
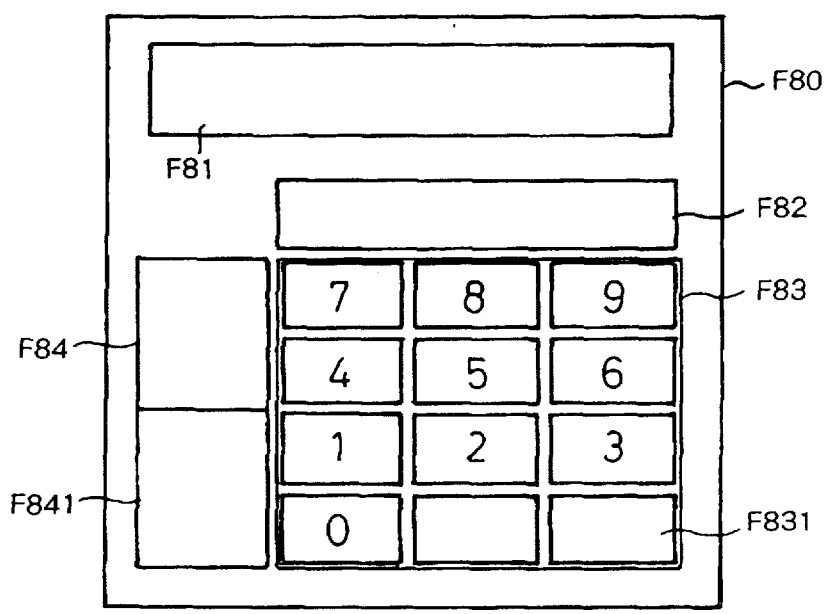
FIG. 15 is a schematic diagram for a modification step.

FIG. 15 is a fragmentary illustration for modification of the delivery turn.

This partial picture includes a title column F81, a turn displaying column F82, a ten-key assembly F83, and a turn operation area F84, and is also displayed by developing a window. Ten-key assembly F83 includes each of ten-keys, a retard key, and a erase key for erasing the retard number.

Turn operation area F84 includes a decision key column F841 and a suspending key column for suspending the modification and returning to the initial picture.

The procedure of modifying the conveyance state will be hereinafter described with reference to FIGS. 9, 10, and 12 to 16.

Figure 16:
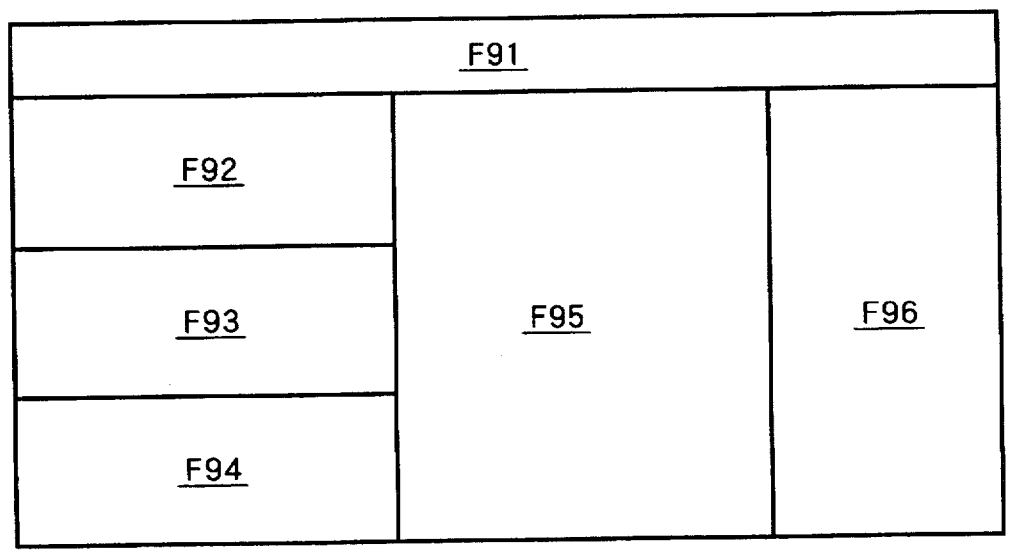
FIG. 16 is a schematic diagram for a conveyance state modification.
Figure 17:
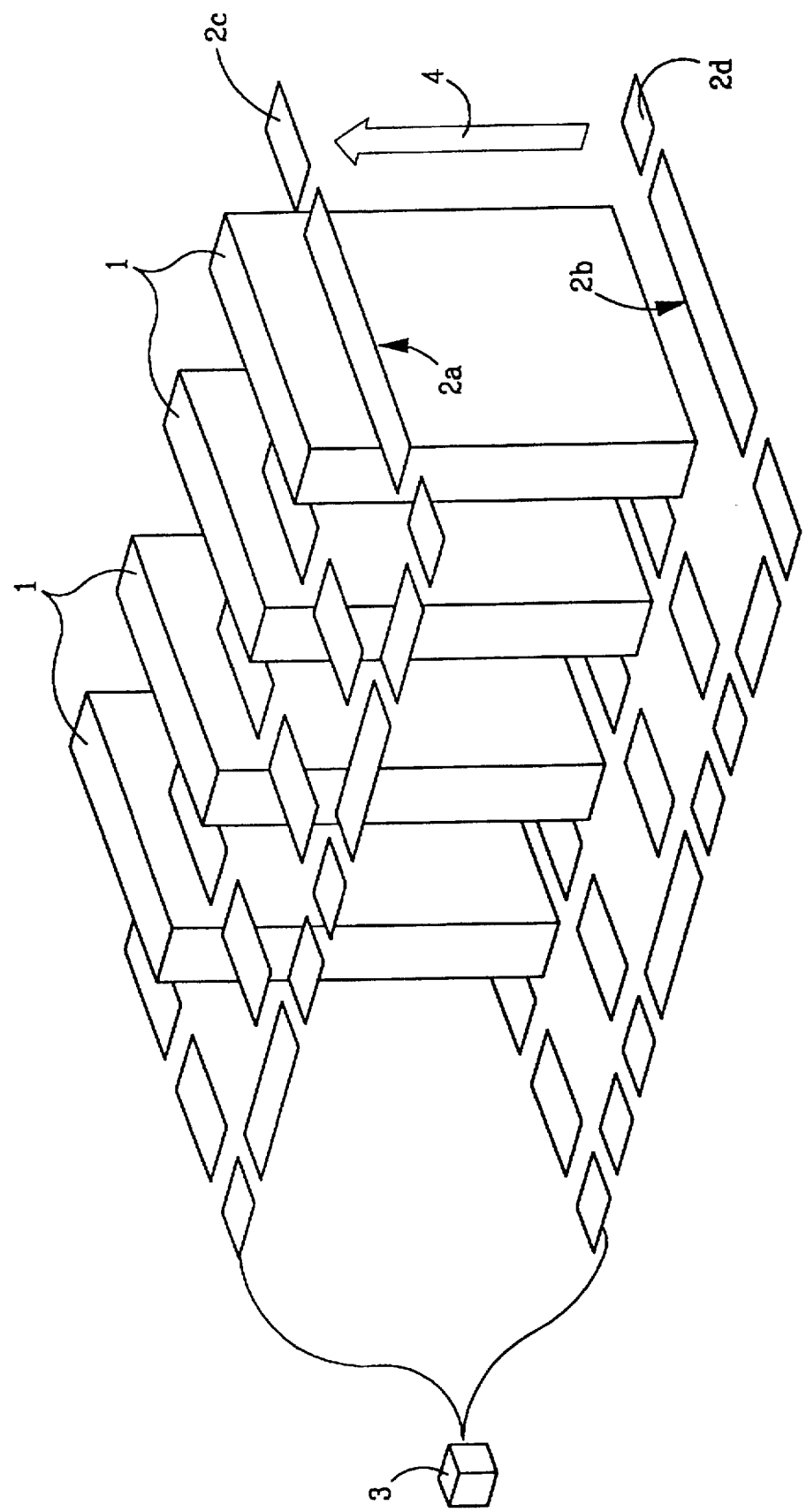
FIG. 17 is a perspective view of a typical automated storehouse system.
Figure 18:
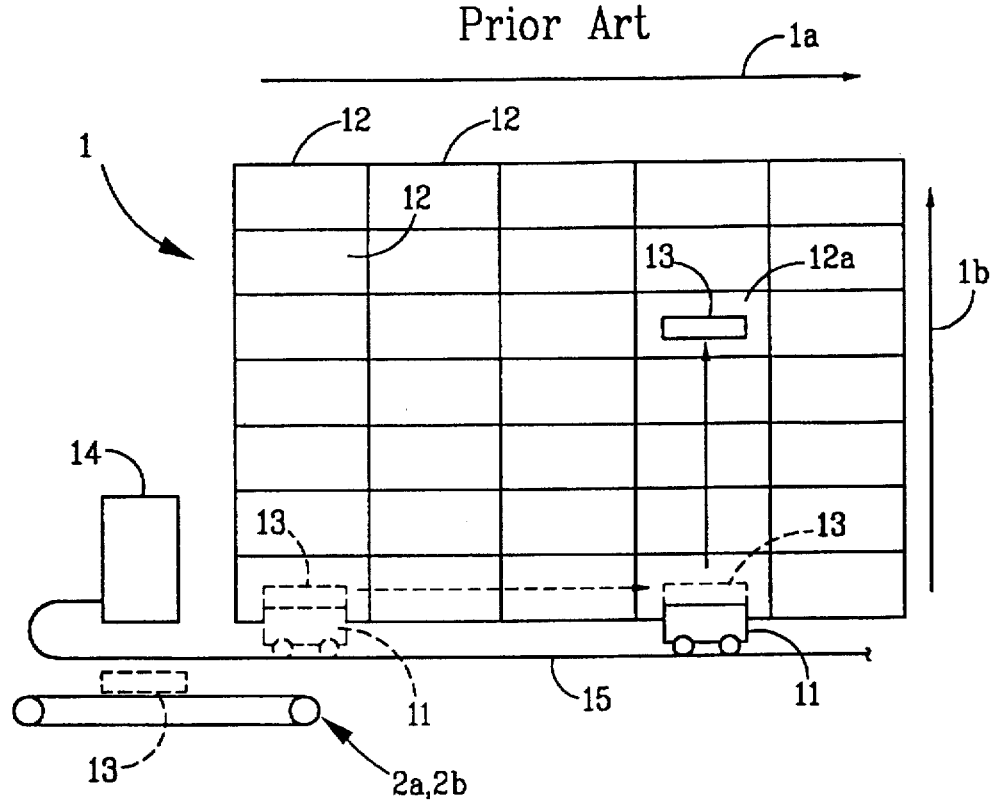
FIG. 18 is a schematic diagram of storehouse facilities in FIG. 17.

In step S 391 in FIG. 9, when the operator depresses a modifying; key for conveyance state at the informing step, a picture of FIG. 16 for modifying the content of the conveyance state.

Next, viewing FIG. 16, the operator confirms the data content as to whether an instruction is of storage or delivery to compare these with the parts for which actually the modification would be instructed, and, based on the difference found by such comparison, press on the column of the corresponding item of the specification.

Subsequently, the operator confirms that the data content is displayed in the title section F9, and thereafter press on the decision key in the operation selection device to modify the content of conveyance state.

In such a manner, in the entire conveyance path, the occurrence of conveyance deviation is represented in the form of a summarized plane view, the conveyance state in the converyance path is informed in succession for the operator, and the corresponding conveyance state is easily corrected.

In addition, the conveyance path to be corrected at every instant is specified and the conveyance state is displayed: wherein, at storage, the shelf location being specified or the specification information is corrected, while, at delivery, either the order, by which the priority of delivery is permitted, or the specification information is corrected.

Further, the conveyance path to be corrected at every instant and an arbitrary conveyance path are specified, and thereby each conveyance state is displayed and is corrected.

The present invention is not limited in the aforementioned embodiments, and for example, each figure construction is permitted for various forms based on the actual conveyance paths; the figures associated with each operating key may be slightly minimized to be displayed in a simple form; the display of the processing state for each function may be combined in parallel, or may be emphasized by means of coloring, enlarging or any of graphic representation or animation; and various modifications are also allowed in the range not deviated from the scope of the present invention.

The present invention provides the following effects.

(1) The difference of the coveyance state, when the actual stored state is different from that being displayd, is immediately recognized and therefore can be easily corrected.

(2) The indication of the storage state, as is normally replaced by a plane figure and displayed, can be properly understood in a short time by the operator.

(3) The indication of abnormality correction, as is displayed by the new location after correction and the previous location by the particular pattern, also can be easily understood by the symbolized form of an array of letters without relying upon any special thinking and properly formed in a short time by the operator.

(4) For instructing the content of correcting the storage abnormality, as such instruction can be performed visually by one touch action of pressing a displayed pattern on a plan view figure, the correction can be properly instructed only by a short time operation.

(5) Since the movement indication on the display means is replaced to a visual figure and displayed in a summarized form, the difference from the actual status of the storehouse is easily understood in a short time by the operator.

(6) The correction for the conveyance deviation, as is entered by pressing on a displayed pattern of the conveyance state, is properly instructed with visually one touch operation by the operator.

(7) In addition, the completion of the correction process as well as modification of priority order of storage/delivery can be instructed by a key entry visually with a short time operation.

As stated above, the operations can be performed by even a person not so familiar with the art without operational errors.

What is claimed is:

1. A method of correcting as necessary a stock condition of component parts in an automated storehouse having an inlet and an outlet comprising the steps of:

applying specification information to specify production component parts;

monitoring the state of parts being stored in view of storehouse facilities in conjunction with said specific information;

displaying entirely a plurality of storehouse facilities in the form of a plan view;

informing a storage abnormality when the actual storage location and stock condition are different from that displayed in parallel with displaying the stock condition at each instant;

correcting the stock condition at the time the storage abnormality is informed;

displaying correcting information at least at said inlet and said outlet in one image comprising a first partial image to display storage facilities into which component parts are to be stored, a second partial image to display delivery facilities from which component parts are to be delivered, and a third partial image to display operating guidance;

wherein the first partial image includes an introducing path for introducing a storage container into the storage facility by a storing conveyer, a distributing path for distributing the storage container to a selected storage bank of the storage facilities, a guide path for transferring the storage container to an automotive transporter, and a storing path for storing the storage container by the automotive transporter to a selected storage shelf of the selected storage bank; and wherein the second partial image includes an outlet path for delivering the storage container by a delivery conveyer, a confluence path for transferring the storage container to the outlet path from a selected bank of the delivery facilities, a transmitting path for transferring the storage container from a delivery automotive transporter, and an obtaining path for obtaining the storage container by the delivery automotive transporter from a selected storage shelf; and wherein the display of the storing path and the display of the obtaining path each include a display of an instruction shelf column for representing bay and level values for a selected storage shelf, a transport indicating column for indicating a storage/delivery distinction and an identification number of an automotive transporter, and a bank indication column for numerically representing a corresponding bank.

2. A method of correcting a stock condition according to claim 1, wherein said stock condition is represented by a plurality of shelves to be filled with said parts, and said shelves are distinguished by means of displayed figures in accordance with shelves in which already stored, shelves still remaining empty, and shelves for which storage is prevented; and said stock condition of said storehouse facilities is displayed by specifying any of said storehouse facilities on said displayed surface.

3. A method of correcting a stock condition according to claim 1 or 2, wherein said correction comprising the steps of:

appointing an arbitrary shelf within said storehouse facilities on the displayed surface; and displaying information of specification of parts stored on said appointed shelf.

4. A correction apparatus for correcting as necessary the stock condition of component parts within storehouse facilities in an automated storehouse comprising:

means for specifying the component parts by an entry of specification information;

means for monitoring said stock condition of said parts by correlating said storehouse facilities with said specification information;

display means for entirely displaying a plurality of storehouse facilities in the form of a plan view to illustrate in succession said stored state at each point of time;

means for informing an abnormality of said stored state when the stored location and stored state are different from that being displayed;

means for correcting said stored state for which any abnormality of storing is informed; and a second display device installed at least at two places of an inlet and an outlet;

wherein each second display device displays work status of storehouse facilities in one image comprising a first partial image to display storage facilities into which component parts are to be stored, a second partial image to display delivery facilities from which component parts are to be delivered, and a third partial image to display operating guidance;

wherein the first partial image includes an introducing path for introducing a storage container into the storage facility by a storing conveyer, a distributing path for distributing the storage container to a selected storage bank of the storage facilities, a guide path for transferring the storage container to an automotive transporter, and a storing path for storing the storage container by the automotive transporter to a selected storage shelf of the selected storage bank;

wherein the second partial image includes an outlet path for delivering the storage container by a delivery conveyer, a confluence path for transferring the storage container to the outlet path from a selected bank of the delivery facilities, a transmitting path for transferring the storage container from a delivery automotive transporter, and an obtaining path for obtaining the storage container by the delivery automotive transporter from a selected storage shelf; and wherein the display of the storing path and the display of the obtaining path each include a display of an instruction shelf column for representing bay and level values for a selected storage shelf, a transport indicating column for indicating a storage/delivery distinction and an identification number of an automotive transporter, and a bank indication column for numerically representing a corresponding bank.

5. A correction method of the conveyance state in an automated storehouse, more specifically for correcting as necessary the stored state of component parts in storehouse facilities of an automated storehouse having an inlet and an outlet comprising the steps of:

specifying said component parts by entry of specification information;

monitoring said stored state of said parts by correlating the conveyance paths of said parts with said specification information, displaying entirely the conveyance paths in said automated storehouse in the form of a plan view to illustrate in succession said stored state at each point of time, informing an abnormality of said stored state when the stored location and stored state are different from that being displayed, correcting said stored state for which any abnormality of storing is informed, and displaying correcting information at least at said inlet and said outlet in one image comprising a first partial image to display storage facilities into which component parts are to be stored, a second partial image to display delivery facilities from which component parts are to be delivered, and a third partial image to display operating guidance;

wherein the first partial image includes an introducing path for introducing a storage container into the storage facilities by a storing conveyer, a distributing path for distributing the storage container to a selected storage bank of the storage facility, a guide path for transferring the storage container to an automotive transporter, and a storing path for storing the storage container by the automotive transporter to a selected storage shelf of the selected storage bank; and wherein the second partial image includes an outlet path for delivering the storage container by a delivery conveyer, a confluence path for transferring the storage container to the outlet path from a selected bank of the delivery facilities, a transmitting path for transferring the storage container from a delivery automotive transporter, and an obtaining path for obtaining the storage container by the delivery automotive transporter from a selected storage shelf; and wherein the display of the storing path and the display of the obtaining path each include a display of an instruction shelf column for representing bay and level values for a selected storage shelf, a transport indicating column for indicating a storage/delivery distinction and an identification number of an automotive transporter, and a bank indication column for numerically representing a corresponding bank.

6. A method of correcting conveyance state according to claim 5, said step of correction including the substeps of: displaying said conveyance state of conveyance paths to be corrected at each point of time, correcting the shelf location or specification information when said parts are stored, and in priority correcting the order of storing entry or correcting said specification information when said parts are delivered.

7. A method of correcting conveyance state according to claim 5, wherein said step of correction is performed in connection with displaying a conveyance path to be corrected and a conveyance state associated with an arbitrary conveyance path.

8. A correction apparatus for correcting as necessary the conveyance state of component parts within storehouse facilities in an automated storehouse having an inlet and an outlet comprising:

entry means for specifying said component parts by entry of specification information;

means for monitoring said conveyance state of said parts by correlating a plurality of conveyance paths with said specification information;

display means for entirely displaying said conveyance paths of said parts in the form of a plan view to illustrate in succession said conveyance paths at each point of time;

means for informing a deviation of conveyance when an actual location and the conveyance state are different from that being displayed;

means for correcting the conveyance state at the point of time when such deviation is informed; and a second display device installed at least at two places of an inlet and an outlet;

wherein each second display device displays work status of storehouse facilities in one image comprising a first partial image to display storage facilities into which component parts are to be stored, a second partial image to display delivery facilities from which component parts are to be delivered, and a third partial image to display operating guidance;

wherein the first partial image includes an introducing path for introducing a storage container into the storage facility by a storing conveyer, a distributing path for distributing the storage container to a selected storage bank of the storage facilities, a guide path for transferring the storage container to an automotive transporter, and a storing path for storing the storage container by the automotive transporter to a selected storage shelf of the selected storage bank;

wherein the second partial image includes an outlet path for delivering the storage container by a delivery conveyer, a confluence path for transferring the storage container to the outlet path from a selected bank of the delivery facilities, a transmitting path for transferring the storage container from a delivery automotive transporter, and an obtaining path for obtaining the storage container by the delivery automotive transporter from a selected storage shelf; and wherein the display of the storing path and the display of the obtaining path each include a display of an instruction shelf column for representing bay and level values for a selected storage shelf, a transport indicating column for indicating a storage/delivery distinction and an identification number of an automotive transporter, and a bank indication column for numerically representing a corresponding bank.

* * * * *